April 20, 1943.  W. M. PATE ET AL  2,316,887
FUEL INJECTION SYSTEM
Filed Nov. 6, 1939  3 Sheets-Sheet 1

Walker M. Pate.
and
Harvey E. Burgdorf.
INVENTORS.

BY Brunnga & Sutherland
ATTORNEYS.

April 20, 1943.  W. M. PATE ET AL  2,316,887

FUEL INJECTION SYSTEM

Filed Nov. 6, 1939   3 Sheets-Sheet 2

WALKER M. PATE.
and
Harvey E. Burgdorf.
INVENTORS.

BY Bruninga & Sutherland
ATTORNEYS.

April 20, 1943.　　W. M. PATE ET AL　　2,316,887
FUEL INJECTION SYSTEM
Filed Nov. 6, 1939　　3 Sheets-Sheet 3

Walker M. Pate.
and
Harvey E. Burgdorf.
INVENTORS

BY Bruninga & Sutherland
ATTORNEYS.

Patented Apr. 20, 1943

2,316,887

UNITED STATES PATENT OFFICE 2,316,887

FUEL INJECTION SYSTEM

Walker M. Pate and Harvey E. Burgdorf,
Ferguson, Mo.

Application November 6, 1939, Serial No. 303,002

2 Claims. (Cl. 123—32)

This invention pertains to internal combustion engines of the fuel-injection type, and more particularly to the fuel injection and combustion features of such engines.

In the internal combustion engine of this type, of which the Diesel engine is an example, the development of high speed engines has been retarded somewhat by difficulties in overcoming the tendency to knock. This tendency may be considered inherent in this type of engine on account of the fact that the air charge must be highly compressed in order to effect ignition, and the fact that combustion of the fuel adds to that pressure so as to produce a high peak pressure. Various arrangements have been proposed to overcome this tendency or to prevent or retard the development of a high peak pressure, and some of these have been fairly successful; for instance, the provisions of a so-called turbulence chamber, connected with the combustion chamber to promote a rapid mixture of the fuel and air and to provide additional volume in which the initial explosion may take place so as to avoid a rapid rise in pressure. Another arrangement has been to provide a so-called precombustion chamber, which is connected with the main combustion chamber usually through a somewhat restricted passage, the mixture being ignited first in the pre-combustion chamber and the pressure and flame developed thereby transferred to the main combustion chamber through the restricted passage, so that the pressure acting on the piston rises more gradually.

One of the objects of this invention is to provide an improved method for retarding the rapid rise of pressure in an engine cylinder of this type.

Another object is to provide a structure providing a chamber which may act as a relief chamber to receive and store a portion of the air charge and into which the pressure created by combustion of the charge in the cylinder may be relieved during the early portion of the power stroke.

Another object is to provide such a relief chamber which will receive excess pressure during the early portion of the power stroke and thereafter, when the pressure in the cylinder has fallen, will return its portion of the charge to the cylinder so as to prevent a too rapid fall in pressure and to insure complete combustion of the fuel.

Another object is to provide an injection nozzle structure having such a chamber embodied in the structure of the nozzle and which is removable as a unit from the engine.

Another object is to provide such a nozzle structure with improved means to facilitate cleaning the same and for preventing an accumulation of carbon therein.

Further objects will appear from the following description, taken in connection with the accompanying drawings, in which.

Figure 3:
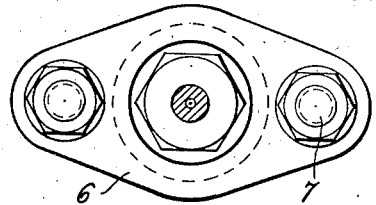
Figure 3 is a top view of Figure 1.
Figure 2:
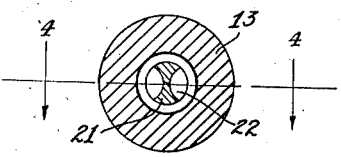
Figure 2 is a section on line 2—2 of Figure 1.

Referring now to the drawings, and more particularly Figures 1 to 4, I designates the engine block or that part of it in which the fuel injection nozzle is mounted. This part has a bore 2 communicating with the engine cylinder 3. The injection unit, which is removably mounted in the bore 2, comprises in this embodiment a body 4 which may be arranged to fit in the bore 2 and may be provided with a suitable shoulder 5, or other means adapted to receive fastening means, such as a yoke 6 secured in place by studs 7. The body 4 is provided with a fuel duct 8 and means for attachment thereto, so as to communicate with said duct, of a fuel supply line 9. The duct 8 may be provided with an enlarged portion 10 in which may be mounted one or more check valves 11, arranged to close the duct 8 until the pressure therein has attained a certain minimum value at which injection is to take place.

Mounted on the body 4 in any suitable manner, as by means of a sleeve 12, is a fuel nozzle 13 having a fuel duct 14 communicating with the duct 8. The sleeve 12 may be provided with a screw-threaded connection to the body 4 and with an internal shoulder 15 adapted to receive a complementary shoulder on the nozzle 13, so that when the sleeve is screwed up on the body 4 the nozzle will seat against the lowermost of the check valves 11. If desired, suitable gaskets may be placed between the nozzle and the valves and between successive valves so as to prevent leakage of fuel under the high pressure necessary for injection.

Mounted on the body 4, as for instance by means of a screw-threaded connection with the sleeve 12, is a hollow cap 16 providing therewithin a relief chamber or air storage chamber 17. The lower end of the chamber 17 tapers to a restricted inlet and outlet passage 18, which may be provided with a flared mouth as indicated at 19. The relation of the nozzle 13 to the chamber 17 is such that the nozzle extends through a major portion of that chamber so that its tip stands comparatively close to the passage 18. The tip of the nozzle is provided with a spray opening 20 which is directed so that a jet of fuel ejected therefrom will be projected through the passage 18 into the cylinder 3.

In order to prevent the accumulation of carbon within the duct 14 a cleaning implement 21 may be loosely mounted within the duct 14. As shown more particularly in Figure 4, the implement 21 may be provided with a spiral groove 22 similar to that formed in the ordinary twist drill and may have a conical end 23 adapted to rest on the similarly shaped internal surface of the nozzle 13. The effect of the spiral groove 22 is to react with the stream of fuel which passes through the duct 14 at a high velocity at each injection so as to cause the implement 21 to rotate. Such rotation tends to loosen any carbon deposit which may tend to form within the duct 14, and the high velocity stream of fuel will carry any such loosened carbon out of the nozzle. As the implement 21 operates at each injection there is no chance for any deposit of carbon to form.

In the operation of this device it is believed that the following takes place, although this explanation is based on theory:

After the engine has operated the duct 8—14 is filled with fuel. During the compression stroke the check valves 11, of course, are closed and fuel is held within the duct 14. The volume of this duct is preferably made sufficient to carry a complete charge of fuel for one injection or a little more. In the beginning of the compression stroke both the cylinder 3 and the chamber 17 are filled with air. As the air is compressed in the cylinder 3 during the compression stroke a portion of the air charge in the cylinder is forced through the passage 18 into the chamber 17. The air in the chamber 17 increases in pressure as the pressure in cylinder 3 increases, but the pressure in the chamber 17 is always less than that in the cylinder since during the compression stroke its pressure is derived from that in the cylinder, and on account of the restriction of the passage 18 the flow to the chamber 17 is retarded. On account of this retardation, the pressure in the chamber 17 does not become high enough to cause ignition (particularly as the mixture therein is too lean) before ignition takes place in the cylinder.

At the proper point in the stroke, usually a few degrees ahead of top dead center, the fuel injection pump operates to suddenly raise the pressure in the duct 8. When this pressure rises to a value sufficient to open the check valves 11, injection takes place by a jet of fuel issuing from the spray opening 20. As the compression stroke is not yet quite finished at the moment of injection, air is still flowing into the chamber 17 through the passage 18. The jet of fuel issuing from the opening 20 is at this time projected through the passage 18 against the flow of the incoming air. This counterflow is effective to start atomization of the fuel immediately upon injection. This is very desirable in an engine of this type, as it prepares the fuel for more rapid ignition and helps to reduce the peak pressure. At this instant the temperature in the chamber 17 is not high enough for ignition and therefore no combustion takes place in this chamber at this time. The fuel jet as it issues from the passage 18 into the cylinder 3, however, encounters a pressure and temperature sufficient for ignition and is ignited in the combustion chamber of the cylinder 3.

When ignition takes place, of course, the pressure in the combustion chamber of the cylinder 3 rises rapidly. However, this pressure may relieve itself to some extent by a further flow of gas through the passage 18 into the chamber 17. This chamber therefore acts for a certain period as a relief chamber, receiving excess pressure from the main combustion chamber and thereby tending to prevent a too rapid increase in pressure in the cylinder. This period probably lasts until the piston passes top center and for a certain time thereafter as the piston moves downwardly under the explosion pressure. During the latter part of this period, however, the gas flowing into the chamber 17 is composed partly of products of combustion and probably also contains some unburned fuel. Accordingly, the mixture in the chamber 17 becomes gradually richer while its pressure rises and hot gases flow in through the passage 18. Accordingly, at a later portion of the stroke, combustion will begin in the chamber 17 and its pressure will be increased by virtue of such combustion. Meanwhile, the piston is moving downwardly and the pressure in the cylinder 3 is falling. At a certain point these pressures reverse, that in the chamber 17 becoming higher than that in the cylinder. At this point therefore the flow of gas will also reverse, and the gas stored in the chamber 17 will flow through the passage 18 into the cylinder 3. This helps to maintain the pressure in the cylinder for a longer period and also probably supplies additional air to assist in completing combustion in the main combustion chamber. Accordingly, the effect of the chamber 17 will be to relieve the excess pressure in the cylinder before its peak pressure is reached and after such peak has been passed will tend to prevent the pressure in the cylinder from falling as rapidly as it otherwise would. The net result, therefore, will be to flatten out somewhat the pressure curve in the cylinder. This action, by preventing too sharp a peak in the pressure, will reduce the tendency to knock, and by maintaining the pressure during the later part of the stroke, will assist in improving the low-speed torque characteristics of the engine.

It will be noted that during that part of the power stroke after injection ceases and the valves 11 are closed, any tendency for fuel to drip from the nozzle 13 may cause a small quantity of fuel to collect at the tip of the nozzle. Since there is at this time a rush of gas out of the chamber 17, such drippage will be caught in that rush and carried out into the main combustion chamber where it is intimately mixed and burned with the charge therein. Thereafter, during the combustion stroke the inrush of air will strip off any further drippage and atomize the same in the chamber 17 in preparation for the next power stroke.

It will be noted also that a complete charge of fuel or a little more is held in the nozzle between strokes and, as this nozzle is positioned in the chamber 17 and a major portion thereof is surrounded by and immersed in the gas in that chamber, the heating of this gas and thereby the nozzle and the metal parts connected thereto during the operation of the engine operates to preheat the fuel charge just prior to its injection into the cylinder. The pressure in the chamber 17 during a certain part of the power stroke after ignition is higher than in the combustion chamber because ignition has taken place in the chamber 17 and caused combustion therein. This combustion is now confined to the latter chamber and, on account of the restriction of the passage 18, rises to a higher value than in the combustion chamber, and, accordingly, the temperature of the confined gas is higher and heats the surrounding metal to a higher point. This heat is communicated to the charge being held in the nozzle. Furthermore, such preheating is carried out without danger of forming a carbon deposit as the cleaning implement 21 disposes of such deposit as fast as it may form. It will be noted that the injection unit comprising the body 4 and the parts carried thereby, namely the nozzle and the cap 16 providing the relief chamber, form a unitary assembly of simple structure, which may be removed from the engine by simply loosening the studs 7 and removing the yoke 6. Accordingly, this unit is easily removable for replacement if defective, or for cleaning if necessary without disturbing other parts of the system other than the supply line 9.

Figures 5 to 8, inclusive, illustrate an injector of the valved type embodying this invention. In this structure the body 4 is provided with a central fuel duct 80 extending along the injector unit and corresponding to the duct 8 in Figure 1. A supply duct 81 communicates with the outer portion of the duct 80 and with a supply connection 82, which connects the supply line 9 to the injector. Removably mounted in the duct 80 and an extension thereof in the nozzle 13, is the stem 24 of a valve 25 arranged to seat in a suitable valve seat 26 in the tip of the nozzle 13. In this structure the valve 25 may be provided with an extension 27 extending through the spray opening 83, corresponding to the spray opening 20 in Figure 1.

The elongated valve stem 24 extends outwardly to the outer portion of the body 4 and near its outer end is provided with a piston 28 which is lapped to a close fit in a cylinder 29 formed in the body 4. The cylinder 29 and the piston 28 are located outwardly beyond the supply duct 81, so that the supply pressure may work against the inner side of the piston. An escape valve 30 may be provided for removing any air which may become entrapped in the supply duct.

A continuation of the valve stem beyond the piston 28 may be provided, as indicated at 31, and on this extension a hardened washer 32 may be mounted to receive the pressure of a spring 33, which is retained by a hood or cap 34 secured on the body 4 by a screw-threaded connection 35, or other suitable attachment. A bleed-off line 36 may be attached to the cap 34 to receive any leakage of fuel which may pass the piston 28 and return such fuel to the supply system in any suitable manner well known in the art. In this case also the injector assembly may be secured in the engine by means of a yoke 6 engaging a shoulder 5.

In this structure the fuel entering from the line 9 passes inwardly toward the engine cylinder along the duct 80, which is slightly larger than the stem 24 so as to provide for the passage of an ample amount of fuel. The inner end of the stem 24 is preferably a fairly snug fit in the nozzle 13, so as to accurately guide the valve 25 to its seat 26, and may be provided with one or more grooves 37 extending along that portion which is in the nozzle 13 so as to convey the fuel to the tip of the nozzle. The valve 25 is normally seated upon the seat 26 so that the flow of fuel from the nozzle is prevented until the injection pump operating in the line 9 in the usual manner produces a pressure which, acting upon the piston 28, is sufficient to move that piston against the pressure of the spring 33 and open the valve 25. The adjustment of the spring 33 is such that the pressure necessary to open the valve is also sufficient to inject the fuel from the spray opening 83 through the passage 18 into the cylinder 3, the injector of Figure 5 being mounted in a similar relation to the cylinder to that shown in Figure 1.

Figure 1:
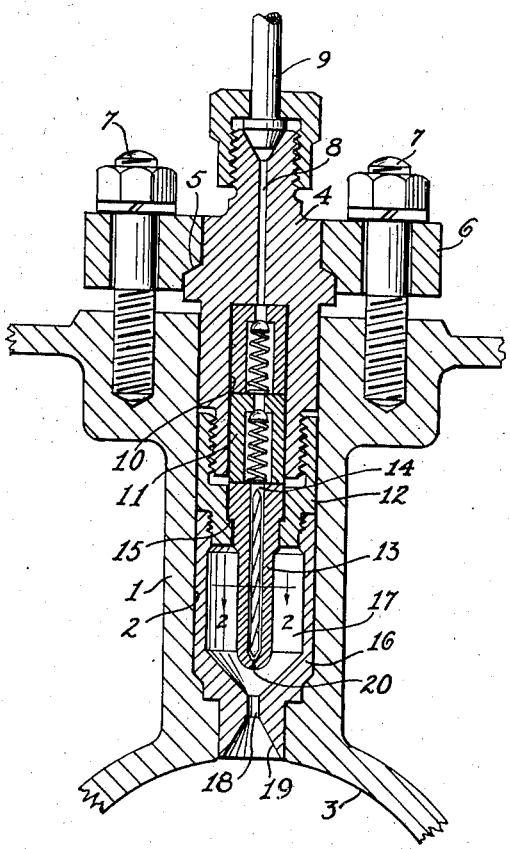
Figure 1 is a sectional view of a part of an engine block and an injection unit embodying this invention.
Figure 4:
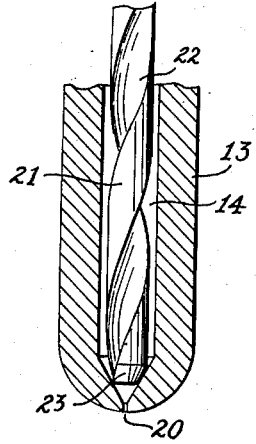
Figure 4 is an enlarged detail of Figure 1.
Figure 7:
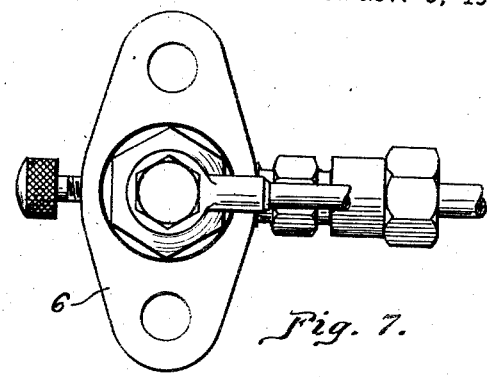
Figure 7 is a top view of Figure 5.

This arrangement operates in a manner very similar to that described for the arrangement of Figure 1. The cap 16 is of similar construction and the nozzle 13 is similarly positioned therein. A charge of fuel is held in the passages 37 between strokes and is preheated by the burning of fuel in the chamber 17, as already described. This preheated fuel is injected into the cylinder 3 when the valve 25 opens. In this construction the piston 28 is placed near the outer end of the stem 24. This has the double advantage of making it unnecessary to lead the fuel supply duct 81 along the body to the inner end thereof in order to join the duct 80 inwardly of the piston, and, by placing the piston at a point spaced from the cylinder, the same may be operated at a lower temperature and therefore troubles due to variation in thermal expansion of the piston and the body 4 are reduced. With this construction also the movement of the stem 24 operates to prevent any formation of a carbon deposit in the ducts 37.

Another advantage of this structure is that the hood 34 may be removed without disturbing the connection of the body 4 to the engine, and thereby the piston 28 and the valve may be removed for inspection or cleaning or replacement. This renders it unnecessary to dismount the entire injector assembly in order to clean the valve.

Figure 5:
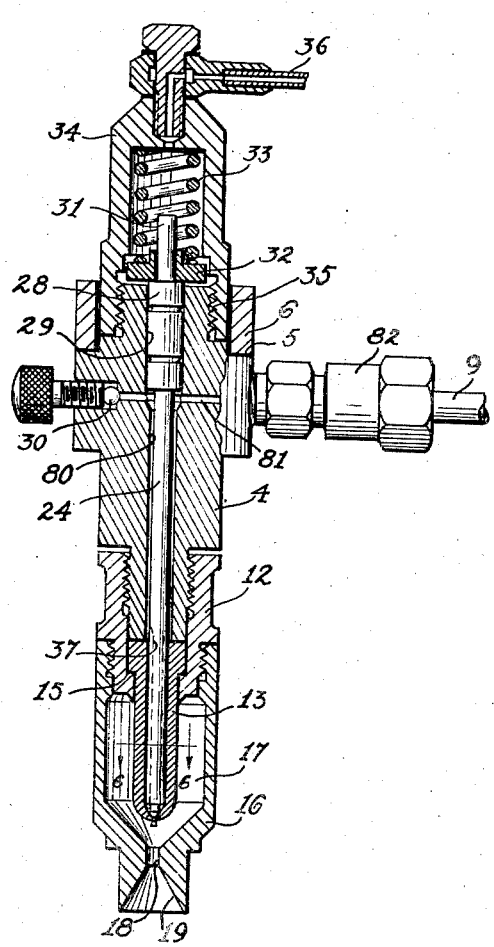
Figure 5 is a longitudinal sectional view of another nozzle unit embodying this invention.
Figure 6:
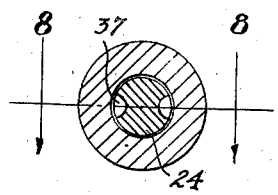
Figure 6 is a section on line 6—6 of Figure 5.
Figure 8:
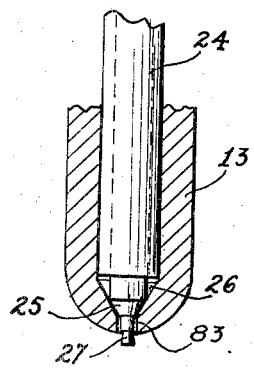
Figure 8 is an enlarged detail of Figure 5.

It will be seen, therefore, that this invention provides an injector which may be embodied in a simple assembly unit removable as a unit from the engine. The structure is such that it may be embodied in a simple cylindrical form which may be slipped into a simple bore hole in the cylinder block. The arrangement by which the relief chamber 17 is embodied in this removable unit makes it easy to keep this chamber clean. It also makes it easy to provide a standard unit embodying different sizes of relief chambers so that the chamber size may be changed in a given engine by simply interchanging the cap 16 and nozzle 13 on the injector unit. The structure lends itself readily to application to either the open injection type, as shown in Figure 1, or the valved type, as shown in Figure 5. In either case, cleaning and maintenance of the unit in good operating order are simplified.

The arrangement of the chamber 17 and the relation to it of the nozzle 13 are such that the chamber may function as a relief chamber, as distinguished from a precombustion chamber. It is known that no ignition takes place in the chamber 17 prior to ignition in the cylinder 3. The fuel projected from the nozzle passes through the passage 18 before it is ignited. This passage is accomplished during the inflow of air to the chamber 17 and in a direction counter to such flow. While a certain small quantity of fuel may be stripped from the marginal portions of the jet by this inflow of air and carried into the chamber 17, the mixture in this chamber is too lean and the temperature too low to cause ignition until past top dead-center on the power stroke.

It has been found that this system functions very satisfactorily when the chamber 17 is given a capacity varying from 12% to 20% of the compressed volume of the combustion space of the cylinder 3. The size of the passage 18 may vary somewhat with the volume of the compartment 17. It is believed that this size should be such that the velocity of inflow of air to the chamber 17 during the compression stroke is somewhat greater than the velocity of the fuel jet. It has been found that the jet will pass through the passage 18 under such conditions and be ignited therebeyond in the cylinder 3. It has also been found that the system operates advantageously when the quantity of fuel held in the duct 14 of Figure 1, or in the passages 37 of Figure 5, is about one and one-half times the full load charge of fuel, namely the quantity of fuel injected into each cylinder at each injection when operating under full load.

Figure 10:
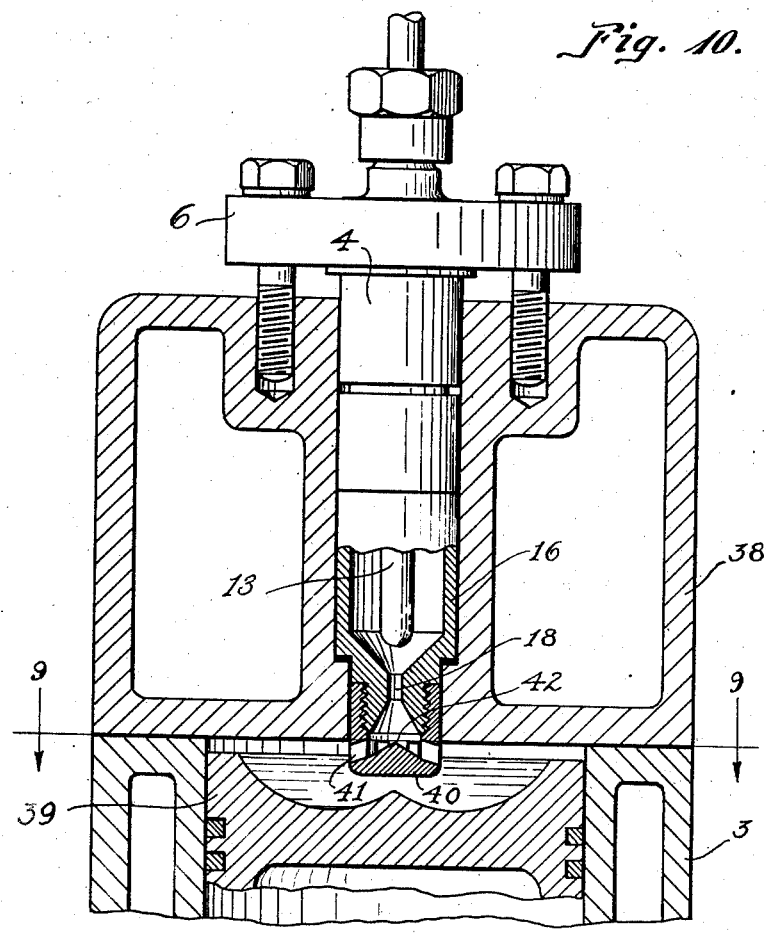
Figure 10 is a partial vertical section of an engine showing another injection device embodying this invention.
Figure 9:
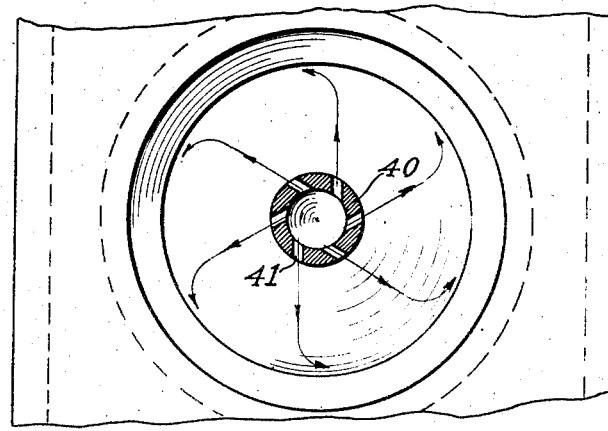
Figure 9 is a section on line 9—9 of Figure 10.

The conditions under which injection devices must be applied to large engines, such, for instance, as slow-speed stationary engines, are usually different from those which obtain in the case of high-speed engines. The mechanical arrangement of the engine sometimes has a marked influence upon this problem. Figures 9 and 10 illustrate one way in which this invention may be applied to larger engines and engines where the mechanical arrangements are such that the injection device must reach the cylinder through the head.

Referring to Figures 9 and 10, a jacketed cylinder 3 is illustrated provided with a head 38, also water-jacketed. The piston is illustrated at 39. In this arrangement the injection unit is inserted through a vertical bore in the head. The unit illustrated in this case is similar to that shown in the other figures. In this case, however, if the unit were used in unmodified form, the injection jet would enter the cylinder along the axis thereof and impinge directly on the piston head. In order to distribute the injected fuel to better advantage and so as to promote and control turbulence in the combustion space, the injection unit in this case is provided with a distributor 40 which may be attached to the end of the cap 16 by threading as shown, or in any other suitable manner. This distributor is provided with a plurality of exit passages 41 whose combined area is preferably greater than the area of the passage 18. The bottom wall of the distributor 40 may be provided with an elevated central part 42 adapted to divide the stream of fuel and distribute it among the several passages 41. These passages may be directed at an angle to the radius of the distributor, as shown in Figure 9, so as to promote a swirling movement of the injected fuel, as indicated by the arrows in Figure 9.

Figure 10 shows the injector placed in the head of an engine and so arranged as to distribute the fuel from the injector and the gases from the relief chamber evenly into the main combustion chamber and across the head of the piston in a desired manner. This is particularly advantageous in large engines. This even distribution of fuel and gases from the injector is obtained by the use of the redirecting distributor 40 which, in the embodiment illustrated, is screwed to the cap 16 of the injector. The openings 41 in the cap can be arranged so as to create any desired turbulence in the cylinder and combustion chamber.

Figure 9 is a section through the distributor showing the openings arranged so as to produce a controlled swirling movement to the burning fuel and air in the cylinder.

It will be noted that the redirecting function exercised by the cap 40 is active not only while the jet of fuel is being projected through the passage 18, but also during that part of the combustion period during which combustion is taking place in the chamber 17 and the products of combustion are flowing through the passage 18 and into the combustion space in the cylinder. At this time a very high pressure is developed in the chamber 17 and the products of combustion are ejected therefrom at a very high velocity. Accordingly, the outflow of these products from the passages 41 will take place at a high velocity and in such a manner as to promote a high degree of turbulence in the combustion space in the cylinder.

Under certain circumstances the cap 40 may become very hot. Accordingly, it has been found advantageous under such circumstances to construct said cap of a material capable of withstanding a high degree of heat. A material which has been found satisfactory for this purpose is stainless steel, although, of course, other materials having the right properties may also be used. The high temperature of this cap has the additional advantage of heating and vaporizing the fuel as it impinges thereon.

While a certain theory of operation has been used to explain the action of the engine, it will be understood, of course, that this is for the purpose of explanation and that the invention is not dependent upon, nor limited to, any given theory. It is further pointed out that certain individual features or sub-combinations may be useful by themselves or in other groupings than those described, and that the employment of such features or sub-combinations is contemplated by this invention when within the scope of the appended claims. It is further obvious that changes in the details of construction may be made within the scope of the appended claims without departing from the spirit of this invention, and that the invention is not limited to the specific details shown and described.

The invention having thus been described, what is claimed is:

1. In a fuel-injection system for an internal combustion engine of the character described having a cylinder provided with a combustion chamber, a fuel-injection unit removably mounted in the engine comprising, a body having means for attachment to the engine and having a fuel duct therethrough, means on said body providing an air chamber having a restricted passage for access thereto, and a fuel nozzle on said body projecting into said chamber to be immersed in the air therein and having a fuel duct connected with said duct through said body, the tip of said nozzle being positioned and arranged within said storage chamber but close enough to said passage to project its fuel jet through said passage to be ignited therebeyond.

2. In a fuel-injection system for an internal combustion engine of the character described having a cylinder provided with a combustion chamber, a fuel-injection unit removably mounted in the engine and providing a body having a fuel duct therethrough, means on said body providing an air chamber having a restricted passage for access thereto, a fuel nozzle on said body projecting into said chamber to be immersed in the air therein and having a fuel duct connected with said duct through said body, the tip of said nozzle being positioned and arranged within said storage chamber but close enough to said passage to project its fuel jet through said passage to be ignited therebeyond, a valve in said nozzle having an elongated stem extending along said fuel ducts, a piston on the outer portion of said stem, and a fuel-supply connection communicating with said ducts between said valve and said piston.

WALKER M. PATE.
HARVEY E. BURGDORF.

CERTIFICATE OF CORRECTION.

Patent No. 2,316,887.   April 20, 1943.

WALKER M. PATE, ET AL.

It is hereby certified that error appears in the printed specification of the above numbered patent requiring correction as follows: Page 2, second column, line 70-71, for "combustion" read --compression--; and that the said Letters Patent should be read with this correction therein that the same may conform to the record of the case in the Patent Office.

Signed and sealed this 29th day of June, A. D. 1943.

(Seal)

Henry Van Arsdale,
Acting Commissioner of Patents.